United States Patent [19]
Laroche et al.

[11] 4,450,189
[45] May 22, 1984

[54] METHOD OF TREATING A POLYMERIZING REACTOR

[75] Inventors: Paul Laroche; Jean-Bernard Pompon, both of Saint Auban, France

[73] Assignee: Chloe Chimie, Puteaux, France

[21] Appl. No.: 387,924

[22] Filed: Jun. 14, 1982

[30] Foreign Application Priority Data

Jun. 26, 1981 [FR] France ................................. 81 12579

[51] Int. Cl.$^3$ ............................................... C08F 2/00
[52] U.S. Cl. .................................... 427/236; 427/239; 526/62
[58] Field of Search .................... 526/62, 74; 427/236; 422/131

[56] References Cited

U.S. PATENT DOCUMENTS

| | | | |
|---|---|---|---|
| 3,778,423 | 12/1973 | Reiter | 526/62 |
| 4,024,330 | 5/1977 | Morningstar | 526/62 |
| 4,093,787 | 6/1978 | Burgess | 526/62 |
| 4,182,809 | 1/1980 | Honig | 526/62 |

FOREIGN PATENT DOCUMENTS 55-21436  2/1980  Japan ..................................... 526/62

*Primary Examiner*—Sam Silverberg
*Attorney, Agent, or Firm*—McDougall, Hersh & Scott

[57] ABSTRACT

A polymerization reactor in which the surfaces therein that are exposed to the polymerization medium are provided with a coating of a modified rosin whereby polymer deposits on such surfaces are substantially reduced and/or easily removed, and method for treatment of same.

14 Claims, No Drawings

METHOD OF TREATING A POLYMERIZING REACTOR

The invention concerns a process of treating a polymerising reactor. It also concerns the polymerising reactor treated by the said process.

One purpose of the invention is substantially to reduce the formation of polymer deposits on the internal surfaces of a polymerising reactor, when a monomeric composition based on vinyl chloride is polymerised therein.

Other aims and advantages will emerge from the following description.

In this description the expression "monomeric composition based on vinyl chloride" or, more briefly, "monomeric composition" refers to vinyl chloride alone or mixed with at least one other monomer which can be copolymerised with vinyl chloride. The monomeric composition based on vinyl chloride contains at least 70% by weight of vinyl chloride. The copolymerisable monomers are those generally employed in conventional methods of copolymerising vinyl chloride. Some examples are vinyl esters of mono- and poly-carboxylic acids, such as vinyl acetate, propionate and benzoate; unsaturated mono- and poly-carboxylic acids, such as acrylic, methacrylic, maleic, fumaric and itaconic acids, their aliphatic, cycloaliphatic and aromatic esters, their amides and their nitriles; alkyl, vinyl and vinylidene halides; alkylvinyl ethers and olefins.

There are various polymerising processes that are normally carried out in reactors which have one or more agitators and are frequently equipped with auxiliary fittings such as deflector(s) and possibly condenser cooler(s), for extracting heat from the contents of the reactor. In many cases these processes leave undesirable polymer deposits on the internal surfaces of the reactor during the polymerising reaction. Not only do these deposits hinder heat transfer from the inside to the outside of the reactor; they also reduce productivity and have an unfavourable effect on the quality of the polymer.

The problem is particularly serious when vinyl chloride polymers are produced industrially, in the form of discrete particles, by polymerising a monomeric composition in aqueous suspension. When such a polymerising process is used, the vinyl chloride and any other monomers are kept in the form of separate droplets, by using suspending agents and agitation. Once the reaction is over the polymer obtained is dried. These reactions involving polymerisation in an aqueous suspension are generally carried out under pressure, in metal reactors equipped with one or more agitators revolving at high speed, one or more deflectors, and possibly one or more condenser coolers. During the polymerising reaction, vinyl chloride polymer forms deposits on the internal surfaces of the reactor and any condenser coolers, and also on the surfaces of the agitators and deflectors. It is obviously necessary to remove the polymer deposits, since they in turn cause other polymer deposits to form on the internal surfaces of the reactor, thus leading to the formation of a crust, which impedes heat transfer and contaminates the polymer formed.

The nature of the polymer deposit on the internal walls of the reactor is such that, in industrial production of the polymers described above, the current practice in the past has been to open the reactor and scrape the polymer deposit on the walls, agitators and deflectors by hand. An operation of this type is not only expensive but has health hazards for the operator. A variety of methods have already been proposed for removing the polymer deposits from the surfaces of the polymerising reactor, particularly cleaning with solvents, by hydraulic means under high pressure (300 to 400 bars) and by mechanical means, but there is no method that has proved to be both perfectly effective and economic.

It has also been proposed to coat the internal surfaces of reactors with various chemical substances, used in solution form, to prevent polymer from being deposited on the surfaces. However, there is a danger that the chemical substances so far proposed may lower the quality of the polymers or copolymers obtained: since they are made of molecules of small dimensions, they may easily migrate within the polymers or copolymers being formed. In addition they often bring a danger of toxicity.

Reactors treated by the method of the invention do not have these disadvantages.

In the method of the invention, a coating solution containing modified rosin is applied to the internal surfaces of the polymerising reactor.

The source of rosin, together with the methods of obtaining it, its composition, properties and derivatives, are described particularly in "Kirk-Othmer Encyclopedia of Chemical Technology" Second edition Volume 17, pages 475 to 508, published in 1968 by Interscience Publishers, a division of John Wiley and Sons Inc.

There are three main sources of resin: oleoresin secreted by live pine wood, oleoresin contained in old stumps of long leaf pine wood, and oils recovered in the paper pulp industry.

There are three important methods of obtaining commercial rosin: distillation of oleoresin from live pine wood, extraction from pine wood stumps by a solvent, and separation from oils recovered in the paper pulp industry.

Rosin is a complex mixture containing chiefly resinic acids. Resinic acids are monocarboxylic acids of the general formula $C_{20}H_{30}O_2$, the predominant ones being acids of the abietic type and acids of the pimaric type.

Molecules of resinic acids have two chemically reactive centres, the double bonds and the carboxyl group. A large number of modifications in structure and many derivatives can be obtained by means of these centres.

In this description the term "modified rosin" refers to any rosin derivative or mixture of rosin derivatives obtained by reactions involving the double bonds of acids of the abietic type. The reactions may in particular consist of addition, hydrogenation, dehydrogenation or polymerisation.

Some examples of compounds which can give rise to an addition reaction with acids of the abietic type are maleic anhydride and fumaric acid. The reaction, producing rosin modified by maleic anhydride or rosin modified by fumaric acid, is generally carried out by heating the reagent in an organic medium above 150° C.

The hydrogenating reaction, producing hydrogenated rosin, may be carried out by passing the melted rosin over a catalyst at a hydrogen pressure of 125 bars at 230° C. for 5 hours. The degree of hydrogenation achieved will vary according to the catalyst used. The higher the degree of hydrogenation, the lower the proportion of acids of the type with two double bonds will be. With Raney nickel catalyst acids of the type with two double bonds are converted to dihydroacids. With a palladium catalyst a highly hydrogenated rosin is obtained, with a complete absence of any acids of the type with two double bonds, a low proportion of dihydroacids and a high proportion of tetrahydroacids.

The dehydrogenating reaction, producing dismuted rosin, comprises applying heat treatment to the rosin at a high temperature, of the order of 270° C., generally in the presence of catalyst. During the treatment, which is known as dismutation, the acids of the abietic type lose two hydrogen atoms, giving dehydroabietic acid, while the hydrogen is partly absorbed by the acids of the pimaric type, producing dihydropimaric acids.

The polymerising reaction, producing polymerised rosin, may be carried out at room temperature in an organic solvent medium, by the action of an inorganic acid such as sulfuric.

Applicants have in fact found that, when the internal surfaces of the polymerising reactor, particularly a reactor where the inner walls are made of stainless steel, are covered with a coating containing said modified rosin, there is a substantial reduction in the formation of polymer deposits on the said surfaces, when a monomeric composition based on vinyl chloride is polymerised in the reactor. It should be noted that the coating behaves equally well on the internal surfaces of a reactor with a glazed internal coating as on those of a reactor where the internal walls are made of stainless steel.

As a means of achieving the aims of the invention, a coating solution generally containing 1 to 10% and preferably 2 to 5% by weight of modified rosin is used.

The coating solution according to the invention comprises an aqueous solution of alkaline hydroxide. Some examples of alkaline hydroxides are sodium hydroxide, potassium hydroxide, lithium hydroxide and ammonium hydroxide. The aqueous coating solutions according to the invention have a pH which is generally over 10 and usually from 11 to 12. They generally contain 0.3 to 3% by weight of alkaline hydroxide.

The coating solutions according to the invention are obtained by conventional methods, normally involving agitation and possibly heat. One can generally operate at any temperature from 0° to 100° C., and it is normal practice to operate at a temperature between 20° and 50° C.

The nature of the coating solution is such that the solution can be applied to the internal surfaces of the reactor without the reactor having to be opened.

In the method of the invention the coating solution is applied to the internal surfaces of the polymerising reactor by any appropriate means, such as a paint brush, other types of brush or spraying, but preferably by spraying. The same treatment is given to all the exposed surfaces inside the reactor, such as those of the agitator or agitators, deflector or deflectors and any condenser cooler or coolers. The coating solution is applied in the form of a layer generally containing 0.2 to 2 g of modified rosin per m², after any excess solution has run down.

In accordance with the invention, many polymerising operations can be carried out without opening the reactor in between. In cases where a polymer deposit is formed on the surfaces of the reactor, it can easily be removed without having recourse to manual scraping or hydraulic cleaning under high pressure. In an experimental series over 100 operations, of polymersing vinyl chloride in suspension, have been carried out in a 25 m³ reactor with its internal surfaces covered with a coating according to the invention, without any preliminary mechanical surface treatment such as polishing. A fresh coating was applied to the surfaces between operations without opening the reactor, by means of spray nozzles mounted on the reactor. At the end of the experiment, when the reactor was opened, there was found to be only a thin deposit on the internal surfaces of the reactor, and this was easily removed, simply by rinsing with a jet of water at low pressure (4 to 5 bars).

Although many operations can be carried out without renewing the surface coating, it has been found preferable to coat the internal surfaces of the reactor before each operation, in order to maximise the advantages provided by the process. All the internal surfaces of the reactor can be reached by using nozzles mounted permanently at appropriate points in the reactor. When it is decided to coat the reactor, it is first emptied and the internal surfaces rinsed with water. The coating solution is sprayed onto the surfaces through nozzles. Any excess coating solution is then allowed to run out of the reactor and, if so desired, passed into a recovery system. All the polymerisation ingredients can then be placed immediately in the reactor in the usual way, and the polymerising operation can be started without the presence of the coating necessitating any change in operating methods. Furthermore, the presence of the coating on the internal walls of the reactor treated by the method of the invention does not in any way impair the quality of the polymer produced.

Although the method of the invention, which concerns the treatment of a polymerising reactor and in particularla reactor for polymerising a monomeric composition based on vinyl chloride, is specifically described in connection with reactors using the technique of polymerisation in suspension, it can also be applied successfully to the treatment of polymerising reactors which use the techniques of polymerisation in emulsion, in microsuspension or in a mass. In these various techniques the monomeric composition based on vinyl chloride is generally polymerised at a temperature of 10° to 90° C. and preferably 40° to 75° C., and the polymerising reaction generally takes from 8 to 20 hours.

The invention also concerns a polymerising reactor where the internal surfaces are covered with a coating comprising modified rosin. The coating generally contains from 0.2 to 2 g of modified rosin per m².

The following examples are given to illustrate the invention.

The polymerising reactors used in the examples are fitted with a deflector and an agitator of the impeller type with 3 blades.

EXAMPLE 1

Five coating solutions, each containing 3% by weight of modified rosin in an aqueous solution containing 1% by weight of sodium hydroxide, are prepared by agitation at 40° C. The following are used as the five respective solutions of modified rosin:

rosin modified by maleic anhydride
rosin modified by fumaric acid
hydrogenated rosin
dismuted rosin
polymerised rosin.

The pH of each coating solution is approximately 11. Five rectangular stainless steel plates are used, measuring 10×6 cm, which have been cleaned and degreased. A paint brush is used to coat both surfaces of the plates with a layer of each of said coating solutions, containing 1.5 g of modified rosin per m², with one coating solution being applied per plate. The plates and a control plate are weighed.

The six plates are fixed to the internal wall of an 800 liter polymerising reactor. 360 kg of deionised water is placed in the reactor, and its agitating speed is set to 180 rpm. 240 g of partially hydrolysed polyvinyl alcohol and 96 g of isopropyl peroxydicarbonate are also introduced then, when the reactor has been closed and put under vacuum, 300 kg of vinyl chloride.

The temperature of the reaction medium is brought to 60° C., corresponding to a relative pressure of 9 bars. This temperature is maintained until the relative pressure in the reactor drops to 5 bars. Polymerisation at 60° C. takes 10 hours.

When the unreacted monomeric composition has been degassed and the reactor emptied, the six plates are removed from the reactor and left to dry.

The weight of each plate is recorded again, and their increase in weight and the quantity of deposit per unit of area are deduced therefrom.

The weights obtained are set out in table 1.

TABLE 1

| | Before polymerisation Weight (g) | After polymerisation | | |
|---|---|---|---|---|
| | | Weight (g) | Increase in weight (g) | Quantity of deposit (g/m$^2$) |
| Control plate | 94.180 | 98.068 | 3.888 | 324.0 |
| Plate treated by the coating solution containing: | | | | |
| rosin modified by maleic anhydride | 94.403 | 95.115 | 0.712 | 59.3 |
| rosin modified by fumaric acid | 94.066 | 94.787 | 0.721 | 60.1 |
| hydrogenated rosin | 92.348 | 93.042 | 0.694 | 57.8 |
| dismuted rosin | 93.822 | 94.479 | 0.657 | 54.7 |
| polymerised rosin | 94.164 | 94.585 | 0.421 | 35.1 |

It will be seen that after polymerization the quantity of deposit on the control plate is 5 to 9 times greater than that on the plates treated with coating solutions containing modified rosin.

EXAMPLE 2

A coating solution, containing 3% by weight of dismuted rosin in an aqueous solution containing 1% by weight of sodium hydroxide, is prepared by agitating at 40° C. The pH of the coating solution is 11.2. A rectangular stainless steel plate is used, measuring 10×6 cm, which has been cleaned and degreased. A paint brush is used to coat both surfaces of it with a layer of said solution, containing 1 g of dismuted rosin per m$^2$. The plate and a control plate are weighed.

Both plates are fixed to the internal wall of an 800 liter polymerising reactor. 360 kg of deionised water is placed in the reactor, and the agitating speed is set to 200 rpm. 240 g of partially hydrolysed polyvinyl alcohol and 96 g of isopropyl peroxydicarbonate are also introduced, followed by 280 kg of vinyl chloride and 20 kg of vinyl acetate when the reactor has been closed and put under vacuum.

The temperature of the reaction medium is brought to 52° C., corresponding to a relative pressure of 7.5 bars. After 30 minutes' polymerisation at 52° C. the agitating speed is set to 240 rpm. This temperature is maintained until the relative pressure in the reactor drops to 5 bars. Polymerisation at 52° C. is carried out for 10.5 hours.

When the unreacted monomeric composition has been degassed and the reactor emptied, the two plates are removed from the reactor and left to dry.

Each plate is reweighed and their increase in weight and the quantity of deposit per unit area are calculated.

The results are set out in table 2.

TABLE 2

| | Before polymerisation Weight (g) | After polymerisation | | |
|---|---|---|---|---|
| | | Weight (g) | Increase in weight (g) | Quantity of deposit (g/m$^2$) |
| Control plate | 92.607 | 92.931 | 0.324 | 270.0 |
| Plate treated with coating solution containing dismuted rosin | 92.502 | 92.554 | 0.052 | 43.3 |

It will be seen that after polymerisation the quantity of deposit on the control plate is over six times greater than that on the plate treated with the coating solution containing dismuted rosin.

EXAMPLE 3

A coating solution, containing 3% by weight of dismuted rosin in an aqueous solution containing 1% by weight of ammonium hydroxide, is prepared by agitation at 40° C. The pH of the coating solution is 10.5. A paint brush is used to coat the internal surface of a 20 liter stainless steel polymerising reactor with a layer of said solution, containing 1 g of dismuted rosin per m$^2$ when any excess solution has run down.

9 kg of deionised water is placed in the reactor, and the agitating speed is set to 120 rpm. 6 g of partially hydrolysed polyvinyl alcohol and 2 g of cyclohexyl peroxydicarbonate are also introduced, followed by 6 kg of vinyl chloride when the reactor has been closed and put under vacuum.

The temperature of the reaction medium is brought to 60° C., corresponding to a relative pressure of 9 bars. When the substance has been polymerised at 60° C. for one hour the agitating speed is set to 150 rpm. This temperature is maintained until the relative pressure in the reactor drops to 7.5 bars. Polymerisation at 60° C. is carried out for 12 hours.

The unreacted monomer is degassed and the reactor emptied.

EXAMPLE 4

A coating solution, containing 3% by weight of dismuted rosin in an aqueous solution containing 1% by weight of potassium hydroxide, is prepared by agitation at 40° C. The pH of the coating solution is 10.8. A paint brush is used to coat the internal surfaces of a 20 liter stainless steel polymerising reactor with a layer of the solution, containing 1.5 g of dismuted rosin per m$^2$ when the excess solution has run down.

8.5 kg of deionised water is placed in the reactor, and the agitating speed is set to 180 rpm. 7.7 g of partially hydrolysed polyvinyl alcohol, 3.1 g of lauroyl peroxide and 0.35 g of cyclohexyl peroxydicarbonate are also introduced, followed by 5.6 kg of vinyl chloride when the reactor has been closed and put under vacuum.

The temperature of the reaction medium is brought to 69° C., corresponding to a relative pressure of 11.5 bars.

This temperature is maintained until the relative pressure in the reactor drops to 8.5 bars. Polymerisation at 69° C. takes 9 hours.

The unreacted monomer is degassed and the reactor emptied.

EXAMPLE 5

A coating solution, containing 4% by weight of rosin modified by maleic anhydride in an aqueous solution containing 1.5% by weight of sodium hydroxide, is prepared by agitation at 40° C. The pH of the coating solution is 12. A paint brush is used to coat the internal surfaces of a 20 liter stainless steel polymerising reactor with a layer of the solution, containing 0.8 g of rosin, modified by maleic anhydride, per $m^2$ after the excess solution has run down.

9 kg of deionised water is placed in the reactor, and the agitating speed is set to 160 rpm. 6 kg of partially hydrolysed polyvinyl alcohol and 2.2 g of cyclohexyl peroxydicarbonate are also introduced, followed by 5.2 kg of vinyl chloride and 0.5 kg of vinyl acetate when the reactor has been closed and put under vacuum.

The temperature of the reaction medium is brought to 64° C., corresponding to a relative pressure of 10 bars. After 30 minutes' polymerisation at 64° C. the agitating speed is set to 220 rpm. This temperature is maintained until the relative pressure in the reactor drops to 5.5 bars. Polymerisation at 64° C. takes 10 hours.

The unreacted monomeric composition is degassed and the reactor emptied.

EXAMPLE 6

A coating solution, comprising 3% by weight of hydrogenated rosin in an aqueous solution containing 1% by weight of potassium hydroxide, is prepared by agitation at 40° C. The pH of the coating solution is 11. A paint brush is used to coat the internal surfaces of a 20 liter stainless steel polymerising reactor with a layer of said solution, containing 0.3 g of hydrogenated rosin per $m^2$ when the excess solution has run down.

9 kg of deionised water is placed in the reactor, and the agitating speed is set to 140 rpm. 7 g of partially hydrolysed polyvinyl alcohol and 2 g of cyclohexyl peroxydicarbonate are also introduced, followed by 5.8 kg of vinyl chloride when the reactor has been closed and put under vacuum.

The temperature of the reaction medium is brought to 60° C., corresponding to a relative pressure of 9 bars. This temperature is maintained until the relative pressure in the reactor drops to 5 bars. Polymerisation at 60° C. takes 10.5 hours.

The unreacted monomer is degassed and the reactor emptied.

EXAMPLE 7

A coating solution, comprising 4.5% by weight of highly hydrogenated rosin in an aqueous solution containing 2% by weight of sodium hydroxide, is prepared by agitation at 40° C. The pH of the coating solution is 12. A paint brush is used to coat the internal surfaces of a 20 liter stainless steel polymerising reactor with a layer of the solution, containing 0.3 g of highly hydrogenated rosin per $m^2$ when the excess solution has run down.

9 kg of deionised water is placed in the reactor, and the agitating speed is set to 150 rpm. 6 g of partially hydrolysed polyvinyl alcohol and 2.3 g of cyclohexyl peroxydicarbonate are also introduced, followed by 5.4 kg of vinyl chloride and 0.6 kg of vinyl acetate when the reactor has been closed and put under vacuum.

The temperature of the reaction medium is brought to 62° C., corresponding to a relative pressure of 9.5 bars. When polymerisation has taken place for 1 hour at 62° C., the agitating speed is set to 240 rpm. This temperature is maintained until the relative pressure in the reactor drops to 5 bars. Polymerisation at 62° C. takes 10 hours.

The unreacted monomer is degassed and the reactor emptied.

EXAMPLE 8

A coating solution, comprising 3% by weight of dismuted rosin in an aqueous solution containing 1% by weight of sodium hydroxide, is prepared by agitation at 40° C. The pH of the coating solution is 11. The internal surfaces of an 800 liter polymerising reactor, with a glazed internal coating, are sprayed with a layer of the coating solution, containing 0.4 g of dismuted rosin per $m^2$ when the excess solution has run down.

340 kg of deionised water is placed in the reactor and the agitating speed is set to 200 rpm. 240 g of partially hydrolysed polyvinyl alcohol and 94 g of isopropyl peroxydicarbonate are also introduced, followed by 210 kg of vinyl chloride and 18 kg of vinyl acetate when the reactor has been closed and put under vacuum.

The temperature of the reaction medium is brought to 64° C., correponding to a relative pressure of 10 bars. This temperature is maintained until the relative pressure in the reactor drops to 4.5 bars. Polymerisation at 64° C. takes 11 hours.

The unreacted monomer is degassed and the reactor emptied.

EXAMPLE 9

A coating solution, comprising 8% by weight of dismuted rosin in an aqueous solution containing 2.5% by weight of potassium hydroxide, is prepared by agitating at 40° C. The pH of the coating solution is 11.2. The internal surfaces of an 800 liter polymerising reactor, with a glazed internal coating, are sprayed with a layer of said coating solution, containing 1.5 g of dismuted rosin per $m^2$ when the excess solution has run down.

360 kg of deionised water is placed in the reactor, and the agitating speed is set to 140 rpm. 240 g of partially hydrolysed polyvinyl alcohol and 86 g of isopropyl peroxydicarbonate are also introduced, followed by 300 kg of vinyl chloride when the reactor has been closed and put under vacuum.

The temperature of the reaction medium is brought to 68° C., corresponding to a relative pressure of 11 bars. This temperature is maintained until the relative pressure in the reactor drops to 7.5 bars. Polymerisation at 68° C. takes 10 hours.

The unreacted monomer is degassed and the reactor emptied.

EXAMPLE 10

A coating solution, comprising 3% by weight of rosin, modified by fumaric acid, in an aqueous solution containing 1% by weight of sodium hydroxide, is prepared by agitation at 40° C. The pH of the coating solution is 11.4. The internal surfaces of an 800 liter polymerising reactor, with a glazed internal coating, is sprayed with a layer of said coating solution, containing 0.25 g of rosin, modified by fumaric acid, per m² after draining.

360 kg of deionised water is placed in the reactor, and the agitating speed is set to 220 rpm. 240 g of partially hydrolysed polyvinyl alcohol and 94 g of isopropyl peroxydicarbonate are also introduced, followed by 280 kg of vinyl chloride and 20 kg of vinyl acetate when the reactor has been closed and put under vacuum.

The temperature of the reaction medium is brought to 52° C., corresponding to a relative pressure of 7.5 bars. This temperature is maintained until the relative pressure in the reactor drops to 5 bars. Polymerisation at 52° C. takes 12 hours.

The unreacted monomer is degassed and the reactor is emptied.

EXAMPLE 11

A coating solution comprising 3% by weight of dismuted rosin in an aqueous solution containing 1% by weight of ammonium hydroxide, is prepared by agitation at 40° C. The pH of the coating solution is 11. The internal surfaces of an 800 liter stainless steel polymerising reactor are sprayed with a layer of said coating solution, containing 0.5 g of dismuted rosin per m² after draining.

480 kg of deionised water is placed in the reactor and the agitating speed is set to 200 rpm. 200 g of a 3% by weight aqueous solution of methyl cellulose, 200 g of partially hydrolysed polyvinyl alcohol, 70 g of lauroyl peroxide and 60 g of isopropyl peroxydicarbonate are also introduced, followed by 310 kg of vinyl chloride and 19 kg of vinyl acetate when the reactor has been closed and put under vacuum.

The temperature of the reaction medium is brought to 62° C., corresponding to a relative pressure of 9.5 bars. This temperature is maintained until the relative pressure in the reactor drops to 5 bars. Polymerisation at 62° C. takes 10 hours.

The unreacted monomer is degassed and the reactor emptied.

EXAMPLE 12

A coating solution, comprising 3% by weight of dismuted rosin in an aqueous solution containing 1% by weight of sodium hydroxide, is prepared by agitation at 40° C. The pH of the coating solution is 11. The internal surfaces of a 25 m³ stainless steel polymerising reactor are sprayed with a layer of said coating solution, by means of spray nozzles mounted on the reactor. The layer contains 0.8 g of dismuted rosin per m² after draining.

11 t of deionised water is placed in the reactor and the agitating speed is set to 120 rpm. 6 kg of partially hydrolysed polyvinyl alcohol and 1.5 kg of cyclohexyl peroxydicarbonate are also introduced, followed by 8 t of vinyl chloride when the reactor has been closed and put under vacuum.

The temperature of the reaction medium is brought to 58° C., corresponding to a relative pressure of 8.5 bars. This temperature is maintained until the relative pressure in the reactor drops to 7 bars. Polymerisation at 58° C. takes 8.5 hours.

The unreacted monomer is degassed and the reactor emptied.

EXAMPLE 13

A coating solution, comprising 5% by weight of polymerised rosin in an aqueous solution containing 2% by weight of sodium hydroxide, is prepared by agitation at 40° C. The pH of the coating solution is 11.6. The internal surfaces of a 25 m³ capacity stainless steel polymerising reactor are sprayed with a layer of said coating solution through spray nozzles mounted on the reactor. The layer contains 0.5 g of polymerised rosin per m² after draining.

The same polymerising operation as in example 12 is carried out in the reactor.

The unreacted monomer is degassed and the reactor emptied.

COMPARATIVE TESTS 3A TO 13A

Tests 3A to 13A correspond respectively to examples 3 to 13 and each consist of a polymerising operation. The apparatus and polymerising conditions are the same as those in the said examples, but the reactor is not previously treated in accordance with the invention.

When the reactor has been emptied the following is observed:

In examples 3 to 13 the presence of a very small quantity of deposits on the internal surfaces of the reactor: these are easily removed with a jet of water at low pressure (4 bars).

In tests 3A to 13A the presence of thick deposits on the internal surfaces of the reactor: these require manual scraping and/or hydraulic cleaning under high pressure (300 bars) to remove them.

Table 3 shows the quantities of deposit removed for each of examples 3 to 13 and each of comparative tests 3A to 13A.

TABLE 3

| Examples | | Comparative tests | |
|---|---|---|---|
| References | Quantities of deposit removed (g) | References | Quantities of deposit removed (g) |
| 3 | 5 | 3A | 75 |
| 4 | 6 | 4A | 80 |
| 5 | 12 | 5A | 110 |
| 6 | 15 | 6A | 110 |
| 7 | 15 | 7A | 120 |
| 8 | 110 | 8A | 2000 |
| 9 | 60 | 9A | 1000 |
| 10 | 120 | 10A | 1600 |
| 11 | 90 | 11A | 1100 |
| 12 | 1200 | 12A | 18000 |
| 13 | 1200 | 13A | 14000 |

EXAMPLE 14

Example 14 consists of a series of 50 polymerising operations which are carried out without cleaning the reactor in between. The apparatus, treatment of the reactor and polymerising conditions are the same as those in example 9. The reactor is treated before each polymerising operation.

At the end of the series of polymerising operations, when the reactor has been emptied, the internal walls of the reactor are found to carry only 70 g of deposits and these are easily removed with a jet of water at low pressure (4 bars).

EXAMPLE 15

Example 15 consists of three series of 50, 100 and 200 polymerising operations respectively, which are carried out without cleaning the reactor in between. The apparatus, treatment of the reactor and polymerising conditions are the same as those in example 12. The reactor is treated before each polymerising operation.

At the end of each series of 50 and 100 polymerising operations, when the reactor has been emptied, its internal surfaces are found to carry only 1500 g and 2000 g of deposits respectively, and these are easily removed with a jet of water at low pressure (4 bars).

At the end of the series of 200 polymerising operations, when the reactor is emptied, it is found to carry only 2500 g of deposits.

We claim:

1. A method of treating a polymerizing reactor to minimize polymer build-up comprising coating the internal surfaces within the reactor with a modified rosin, said rosin being chemically modified by reaction with double bonds of the abietic acids present in the rosin, prior to carrying out the polymerization reaction in the reactor.

2. The method as claimed in claim 1 in which the modified rosin is selected from the group consisting of rosin modified by maleic anhydride, rosin modified by fumaric acid, hydrogenated rosin, dismuted rosin and polymerized rosin.

3. The method as claimed in claim 1 in which the coating is applied onto the surfaces within the reactor in the form of a solution containing modified rosin.

4. The method as claimed in claim 3 in which the coating solution contains 1 to 10% by weight of the modified rosin.

5. The method as claimed in claim 3 in which the coating solution contains 2 to 5% by weight of the modified rosin.

6. The method as claimed in claim 3 in which the coating solution comprises an aqueous solution of an alkaline hydroxide.

7. The method as claimed in claim 6 in which the alkaline hydroxide is selected from the group consisting of sodium hydroxide, potassium hydroxide, lithium hydroxide and ammonium hydroxide.

8. The method as claimed in claim 6 in which the pH of the coating solution is above 10.

9. The method as claimed in claim 3 in which the coating solution is applied in the form of a layer containing 0.2 to 2.0 grams of modified rosin per $m^2$.

10. The method as claimed in claim 3 in which the coating solution is applied by spraying the coating solution onto the internal surfaces of the reactor.

11. The method as claimed in claim 3 in which the coating solution is applied by brushing the coating solution onto the internal surfaces of the reactor.

12. The method as claimed in claim 2 in which the coating solution is applied prior to each polymerization reaction.

13. The method as claimed in claim 2 in which the internal surfaces of the reactor are coated after a number of polymerization reactions have been carried out in the reactor.

14. A method of treating a polymerization reactor to minimize polymer build-up therein comprising coating the internal surfaces within the reactor with a rosin which has been chemically modified by addition, hydrogenation, dehydrogenation or polymerization of the double bonds of the abietic acids present in the rosin prior to carrying out the polymerization reaction in the reactor.

* * * * *